(12) United States Patent
Forstall et al.

(10) Patent No.: US 8,190,656 B2
(45) Date of Patent: May 29, 2012

(54) METHOD AND APPARATUS FOR MANAGING FILE EXTENSIONS IN A DIGITAL PROCESSING SYSTEM

(75) Inventors: Scott Forstall, Mountain View, CA (US); Edward D. Voas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/875,830

(22) Filed: Sep. 3, 2010

(65) Prior Publication Data
US 2010/0332460 A1    Dec. 30, 2010

Related U.S. Application Data

(60) Division of application No. 11/496,979, filed on Jul. 31, 2006, now Pat. No. 7,792,881, which is a continuation of application No. 09/904,275, filed on Jul. 11, 2001, now Pat. No. 7,099,869.

(51) Int. Cl.
*G06F 17/30* (2006.01)
(52) U.S. Cl. ......... 707/822; 707/687; 707/745; 715/235
(58) Field of Classification Search .................. 707/609, 707/822, 825, 687, 821, 745; 715/235
See application file for complete search history.

(56) References Cited

U.S. PATENT DOCUMENTS

| | | | |
|---|---|---|---|
| 5,303,361 A | 4/1994 | Colwell et al. | |
| 5,542,086 A * | 7/1996 | Andrew et al. | 707/749 |
| 5,736,983 A | 4/1998 | Nakajima et al. | |
| 5,819,298 A | 10/1998 | Wong et al. | |
| 5,987,506 A | 11/1999 | Carter et al. | |
| 6,012,068 A | 1/2000 | Boezeman et al. | |
| 6,029,160 A | 2/2000 | Cabrera et al. | |
| 6,098,079 A * | 8/2000 | Howard | 707/749 |
| 6,154,740 A | 11/2000 | Shah | |
| 6,178,551 B1 | 1/2001 | Sana et al. | |
| 6,427,032 B1 | 7/2002 | Irons et al. | |
| 6,453,325 B1 | 9/2002 | Cabrera et al. | |
| 6,480,194 B1 | 11/2002 | Sang'udi et al. | |
| 6,529,899 B1 | 3/2003 | Kraft et al. | |
| 6,691,104 B1 | 2/2004 | Kraft et al. | |

(Continued)

FOREIGN PATENT DOCUMENTS

EP    0992898 A1    4/2000

(Continued)

OTHER PUBLICATIONS

PCT International Search Report for PCT Int'l Appln No. US02/22102, mailed Sep. 9, 2002 (6 pages).

*Primary Examiner* — Shahid Alam
(74) *Attorney, Agent, or Firm* — Blakely, Sokoloff, Taylor & Zafman LLP (57) ABSTRACT

Methods and apparatuses for managing file extensions in a processing system. An exemplary method of managing file extensions in a digital processing system involves a user interface and a plurality of files, each file having a name that comprises a filename and an extension. The method includes associating a file with an indicator which is user selectable for a single file in a plurality of files in said digital processing system and which indicates how to display an extension of the file, and assigning a value to the indicator, and displaying a displayed name of the file in the user interface in a style determined by the indicator.

39 Claims, 11 Drawing Sheets

U.S. PATENT DOCUMENTS

| | | |
|---|---|---|
| 6,708,189 B1 | 3/2004 | Fitzsimons et al. |
| 6,801,763 B2 | 10/2004 | Elsey et al. |
| 6,842,176 B2 | 1/2005 | Sang'udi et al. |
| 6,868,424 B2 | 3/2005 | Jones et al. |
| 2002/0080508 A1 | 6/2002 | Alex |
| 2002/0176628 A1 | 11/2002 | Starkweather |

FOREIGN PATENT DOCUMENTS

| | | |
|---|---|---|
| WO | WO 96/03691 A1 | 2/1996 |

* cited by examiner

METHOD AND APPARATUS FOR MANAGING FILE EXTENSIONS IN A DIGITAL PROCESSING SYSTEM

This application is a divisional of U.S. patent application Ser. No. 11/496,979, filed on Jul. 31, 2006, now U.S. Pat. No. 7,792,881, which is a continuation of U.S. patent application Ser. No. 09/904,275, filed on Jul. 11, 2001, now issued as U.S. Pat. No. 7,099,869.

FIELD OF THE INVENTION

The present invention relates to the field of digital processing systems, and more particularly to a file extension management scheme.

BACKGROUND OF THE INVENTION

Digital processing systems use heavily the type information of files (the type of files, or file types). For example, a user interface associates a type of files with an application program so that a standard user operation on one of the files starts the associated application program to operate on that file, such as a mouse click, or a double click on the icon of a file starts the associated program to open that file.

Figure 1:
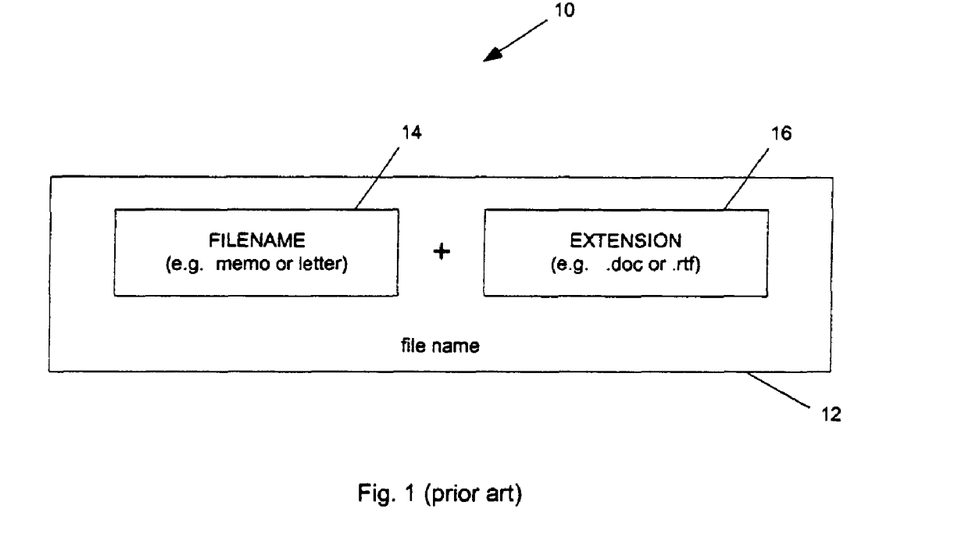
FIG. 1 shows a file name that contains a filename and an extension.

Many digital processing systems, such as machines running Windows OS (Windows machines) and the World Wide Web (the Web), rely heavily on the use of file extensions to store the type information of files. FIG. 1 shows a typical file name on a Windows machine or on the Web. A file name 12 has a filename 14 and an extension 16. For example, a file named "memo.doc" has a filename "memo" and an extension ".doc". Other known extensions associated with other types of files include: ".xls"; ".nfs"; ".pdf"; ".ppt" and many others.

Some digital processing systems rely on their file systems to store the type information. For example, Mac OS, which runs on Macintosh computers, has traditionally relied on the ability of its proprietary file system (HFS/HFS+/AFP) to store the type information. When a file on a Mac is transferred to a Windows machine or the Web, the HFS metadata of the file is lost. The type information of the file is lost, since the Mac OS does not use extensions to store the type information. In order for such a system to interoperate well with Windows machines and the Web, it is desirable that it can also manage extensions.

Figure 2:
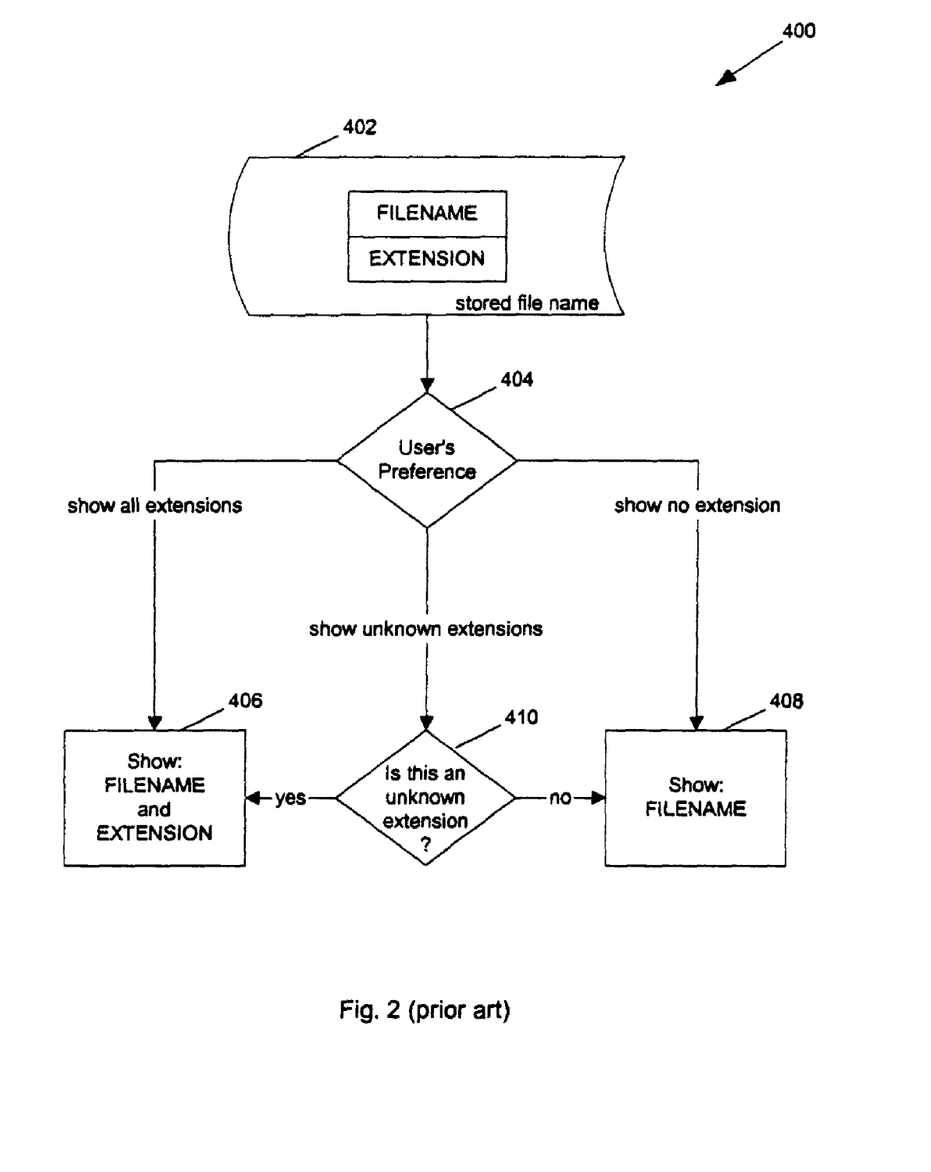
FIG. 2 shows a method for displaying file extensions according to one example of the prior art.

FIG. 2 shows an example of a method for displaying file extensions in the prior art. The user is given a choice with respect to all files to see no extension, all extensions, or unknown extensions. The user's choice is saved as a preference in the system and applies to all files. The extensions of the files are either shown or hidden in the user interface, according to the user's preference and whether the extension of the file to be displayed is known to the system or not. The name of the file saved in memory 402 (e.g. hard drives, floppy diskettes, or other non-volatile memories) contains a filename and an extension. If the user's preference is found to show all extensions in operation 404, operation 406 displays a displayed name of the file in the user interface. The displayed name contains both the filename and the extension. If the user's preference is to show no extension, operation 408 displays a displayed name of the file. The displayed name does not contain the extension. If the user's preference is to show unknown extensions, operation 410 checks whether the extension of the file is known to the system or not. If the extension of the file is of an unknown type, operation 406 makes the extension visible in the user interface for all such files having unknown extensions; otherwise, operation 408 makes the extension invisible in the user interface. Thus, the visibility of the extension of the files in the system is controlled by a single parameter that stores the user's preference.

Figure 3:
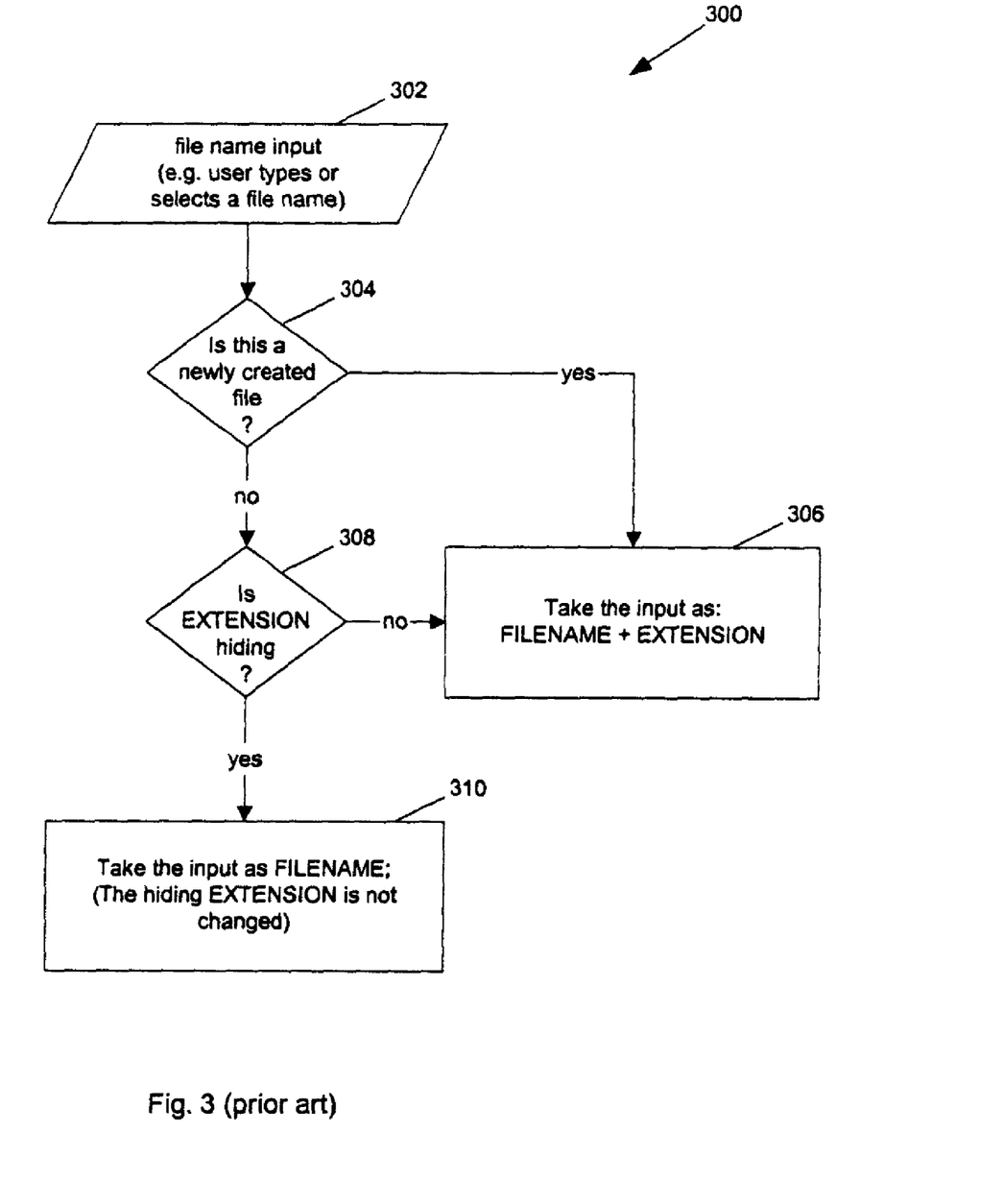
FIG. 3 shows a method for processing file name inputs according to one example of the prior art.

FIG. 3 shows a method for processing the inputs for the name of a file in the prior art. An input 302 may involve a user typing in a name for a file or downloading a file from another system over a network or copying a file from a storage device (e.g. a Zip disk). When it is determined that an input 302 is given to a newly created file (e.g. a file downloaded from another system over a network or copied from a storage device) in operation 304, then operation 306 follows and the input is taken as a file name that contains a filename and an extension. When it is determined that the new name is given to replace the original name of the file in operation 304, operation 308, following the procedure in FIG. 2, checks if the extension of all the files with this extension are currently visible or not in the user interface according to a setting that reflects the user's preference. This setting is for all files, and is not individually selectable for each file. If the extension of the file is visible in the user interface, operation 306 replaces the filename and the extension of the file with those in the input 302. If the extension of the file is invisible in the user interface, operation 310 replaces the filename of the file with the input. In this case if the new input contains an extension, the filename of the file is renamed to have that extension, while the extension of file remains unchanged.

While these prior methods and systems give a user certain degrees of control over the visibility of the file extensions in the user interface, these systems and methods are prone to certain problems. For example, on a system that uses the method shown in FIG. 2, the user cannot selectively make the extensions of some of the files visible, while making the extensions of the other files with the same extensions invisible. If the user chooses to hide all extensions, a file named according to the date, "11.9.00", appears as "11.9" in the user interface. If a new file is given the name "image.jpeg", it is displayed as "image" in the user interface. It is not shown as what the user types. If a user changes the displayed name of the file to "image.jpeg" in the user interface, the name of the file is actually changed to "image.jpeg.jpeg", which has a second extension, according to the method in FIG. 3.

If the user chooses to show all extensions, extensions are shown everywhere, even if the user does not want them or understand what they mean. If the user renames a file "image.jpeg" to "image" in the user interface, the name of the file is changed to "image", which no longer has an extension, when the method in FIG. 3 is used. The type information stored in the extension of the file is lost. The user may not be able to open this file.

If the user chooses to show only unknown extensions, a file named "11.9.00" will be appropriately shown in the user interface as "11.9.00", since ".00" is not a known extension. However, ".mp3" is a known extension. The user cannot see the extension of the file "sound.mp3", even if the user is interested in seeing it. If the user renames the displayed name in the user interface to "sound.mp3", the file is actually named to "sound.mp3.mp3" according to the method in FIG. 3.

Thus, it is desirable to have a user-friendly method to manage the extensions of the files.

SUMMARY OF THE INVENTION

Methods for managing file extensions in a digital or data processing system, such as a computer system, are described here.

In one aspect of the invention, an exemplary method includes associating a file with an indicator which is user selectable for a single file or subset of files in the data processing system. The indicator indicates how to display the extension of the file in the user interface of the data processing system.

In another aspect of the invention, an exemplary method includes processing the user input for the name of a file for display in the user interface, in a fashion that is WYSIWYT, i.e. What You See Is What You Type. When the user types the extension in the user interface, the extension of the file is visible in the user interface. When the user does not type the extension in the user interface, or eliminates the extension, the extension of the file is not visible in the user interface.

In another aspect of the invention, an exemplary method includes detecting naming conflicts when a file is moved into a folder that has existing files on a data processing system or when naming or renaming a file, where the extensions of the files are selectively made invisible. A conflict exists when the displayed names of files in the user interface are the same, whether or not the filenames and the extensions of the files are the same. A conflict also exists when both the filenames and the extensions of the files are the same, whether or not the displayed names of the files are the same or not.

In another aspect of the invention, an exemplary method includes transferring a file between a system that selectively hides the extensions of the files in the user interface and a remote system. Both the filename and the extension of a file will be transferred to the destination system, so that the type information associated with the extension will be transferred along with the file.

The present invention includes apparatuses which perform these methods, including data processing systems which perform these methods and computer readable media which when executed on data processing system cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order not to unnecessarily obscure the present invention in detail.

Figure 4:
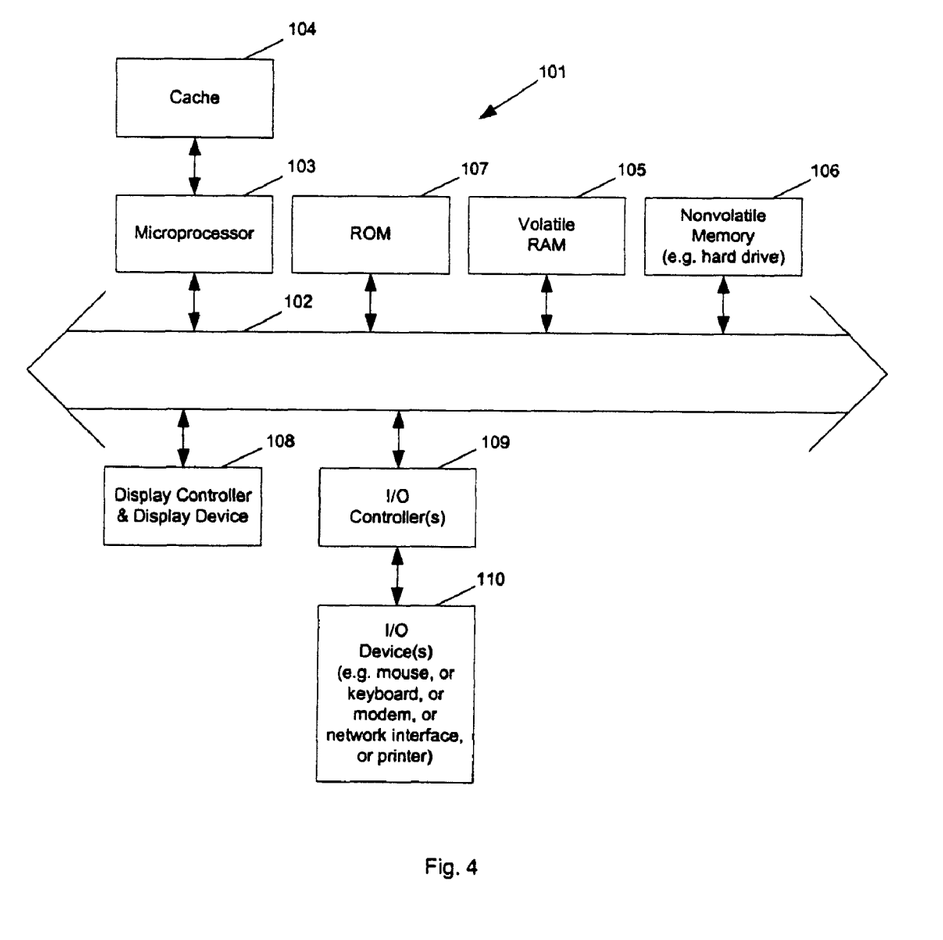
FIG. 4 shows a block diagram example of a data processing system which may be used with the present invention.

FIG. 4 shows one example of a typical computer system which may be used with the present invention. Note that while FIG. 4 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 4 may, for example, be an Apple Macintosh computer.

As shown in FIG. 4, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 4. The bus 102 interconnects these various components together and also interconnects these components 103, 107, 105, and 106 to a display controller and display device 108 and to peripheral devices such as input/output (I/O) devices which may be mice, keyboards, modems, network interfaces, printers and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 4 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

The present invention seeks to manage the extensions of files such that the displayed name of the files in the user interface on a digital process system is WYSIWYT, i.e. What You See Is What You Type. If the user types a file name with an extension in the user interface, the extension of the file is visible in the user interface. If the user types a file name without an extension in the user interface, the extension of the file is invisible in the user interface. In either case the file has an extension in the memory of the digital process system, visible or invisible in the user interface, regardless of whether the user typed the extension or the system automatically supplied an appropriate extension for the file. Normally the extensions are hidden in the user interface so that the user does not have to worry about an accidental type change caused by an accidental change in the extensions.

Figure 5:
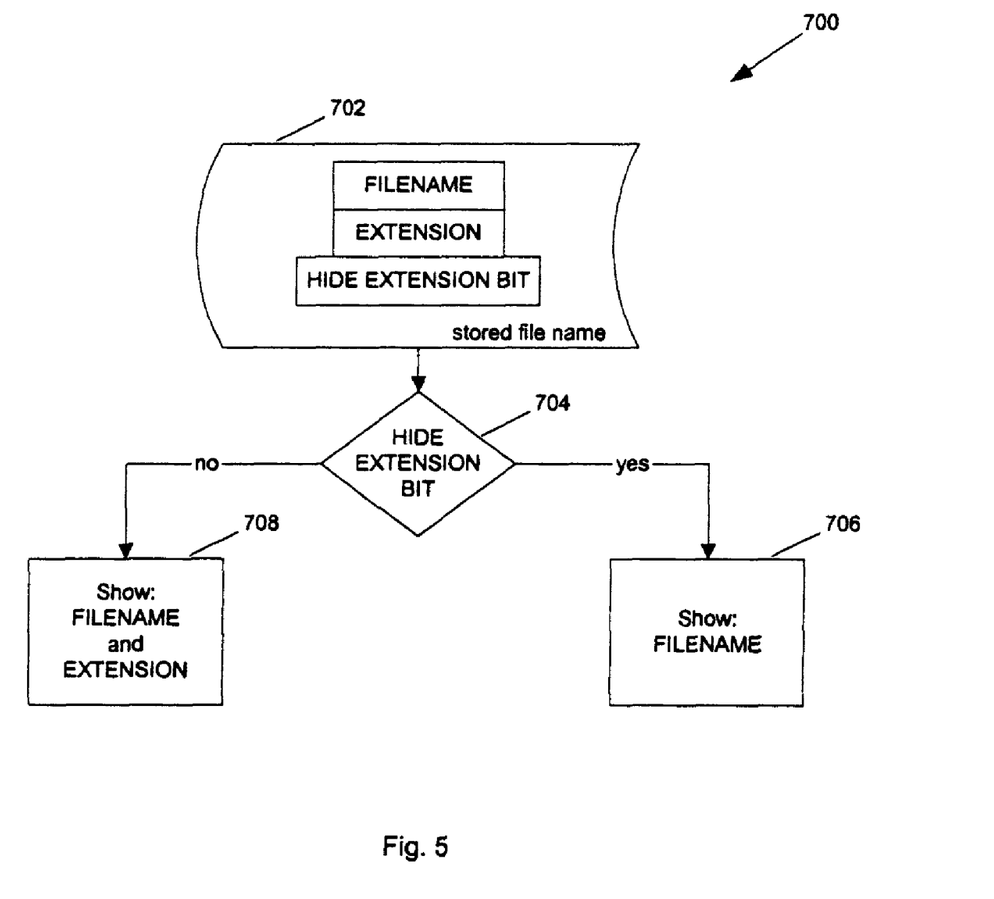
FIG. 5 shows a block diagram example of a method for displaying file extensions according to the present invention.

FIG. 5 shows an example of one embodiment of the present invention for displaying file extensions. A hide extension bit is associated with a file name in the memory 702 of the data processor system. The state of the hide extension bit is checked in operation 704 before the file is displayed in the user interface using operation 708 or 706. When the hide extension bit is YES, operation 706 is used so that the displayed name of the file in the user interface does not contain the extension of the file. In this case the extension is hidden, or invisible, in the user interface. When the hide extension bit is NO, operation 708 is used so that the displayed name of the file in the user interface contains both the filename and the extension of the file. In this case the extension is shown, or visible, in the user interface. While FIG. 5 suggests a preferred embodiment in which a hide extension bit is associated with a file, a hide extension bit can be associated with a subset of files in other embodiments. While FIG. 5 suggests a bit is used to store the information about whether the extension is to be displayed in the user interface or not, more storage spaces can be allocated for such an indicator. In other embodiments, the extensions of the files can be displayed in different styles, such as using a displayed name that has the extension in shade (or in light gray) instead of using a displayed name that does not contain an extension.

Figure 6:
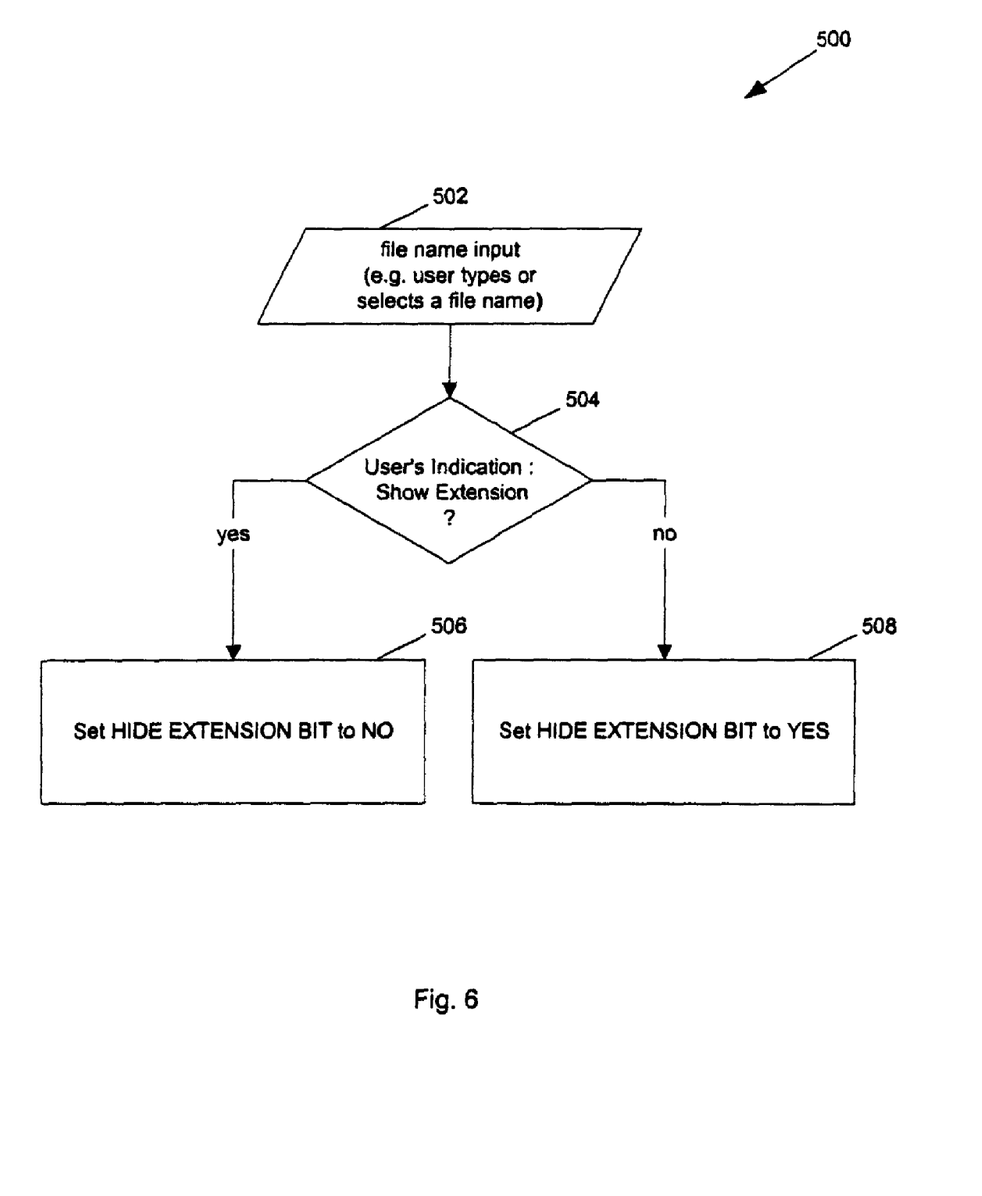
FIG. 6 shows a simplified block diagram example of a method for processing file name inputs according to the present invention.

FIG. 6 shows a simplified example of one embodiment of the present invention for processing the input for a file name in the user interface. An input 502 will be used to determine the user's indication on whether the extension of the file should be visible or not in the user interface in operation 504. When it is determined that the user wants to see the extension, the hide extension bit associated with this file is set, or updated, to NO in operation 506 to indicate that the extension of the file shall be displayed in the user interface. Otherwise, operation 508 is used to set, or update, the hide extension bit to YES to indicate that the extension of the file shall be hidden in the user interface. Once the hide extension bit is set, or updated, methods for showing the displayed name of the file in the user interface, such as those in FIG. 5, can be used to show, or update, the displayed name of the file.

Figure 7:
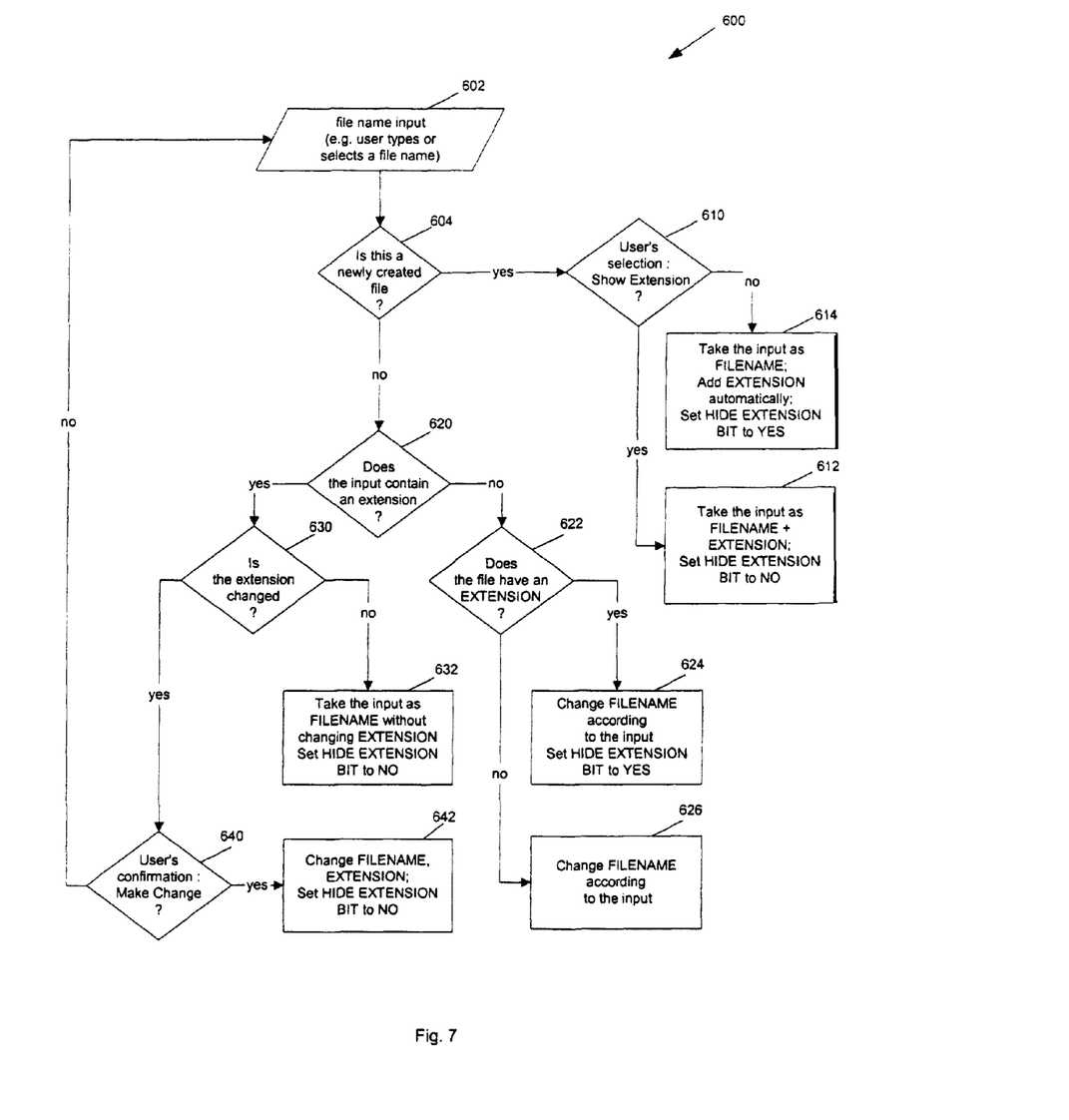
FIG. 7 shows a block diagram example of a method for processing file name inputs according to the present invention.

FIG. 7 shows a detailed example of one embodiment of the present invention for processing the input for a file name in the user interface. An input 602 is processed by the system, depending on whether it's for a new file or not. When it is determined in operation 604 that the input is for a newly created file, operation 610 is used to determine whether the user wants to see the extension of the file in the user interface or not. If the user wants to see the extension of this file, operation 612 is used, which sets the hide extension bit of this file to NO to make the extension of the file visible in the user interface. The input is taken as a complete name that contains a filename and an extension, and the file name and the extension are both displayed.

If the user does not want to see the extension of the file, operation 614 is used, which sets the hide extension bit of the file to YES to make the extension of the file invisible in the user interface. The input is taken as a filename and displayed as a filename without displaying the extension. An appropriate extension of the file will be given automatically by the system based upon the program which created the document which is part of the file.

If the input 602 is for an existing file, such as in the case where the user changes the name of the file by modifying the displayed name of the file in the user interface, operation 620 is used to check if the input contains an extension. If the input does not contain an extension, operation 624 or 626 is used to change the filename of the file, and the input is taken as a new filename. If operation 622 determines that the file has an extension, the hide extension bit is set to make the extension of the file invisible. Since the user did not input the extension, it can be assumed that the user does not want to see the extension of the file. The hide extension bit is set to YES to make the extension invisible in the user interface. If the file previously had a visible extension, operation 624 makes the extension invisible without actually renaming the file to a name that does not have an extension. If the file previously has an invisible extension, operation 624 does not change the extension. The extension of the file remains invisible after operation 624. Thus, the displayed name of the file is consistent with what the user typed in the user interface.

If operation 622 determines that the file has no extension (i.e., the extension of the file is an empty string), the state of the hide extension bit has no effect on the display of the file, and no operation on the hide extension bit is necessary. In one embodiment of the present invention, a file without an associated hide extension bit is an indication that the file has a hide extension bit with a value NO. Thus, the extension of a file without an associated hide extension bit is shown in the user interface. In such an embodiment, a file without an extension is not assigned an associated hide extension bit in order to optimize the storage usage.

If the input contains an extension, it indicates that the user wants to make the extension of the file visible. Operation 630 is used to further determine if the newly supplied extension is the same as the original extension of the file. If they are the same, operation 632 is used to set the hide extension bit of the file to NO so that the extension of the file will be visible in the user interface, if it is not already visible in the user interface. The filename of the file is updated according to the input. If the newly supplied extension is not the same as the extension of the file, the user is asked to confirm the extension change in operation 640. Once the change is confirmed, the filename and the extension of the file will be changed according to the input 602; otherwise, the user has to modify the input.

Figure 8:
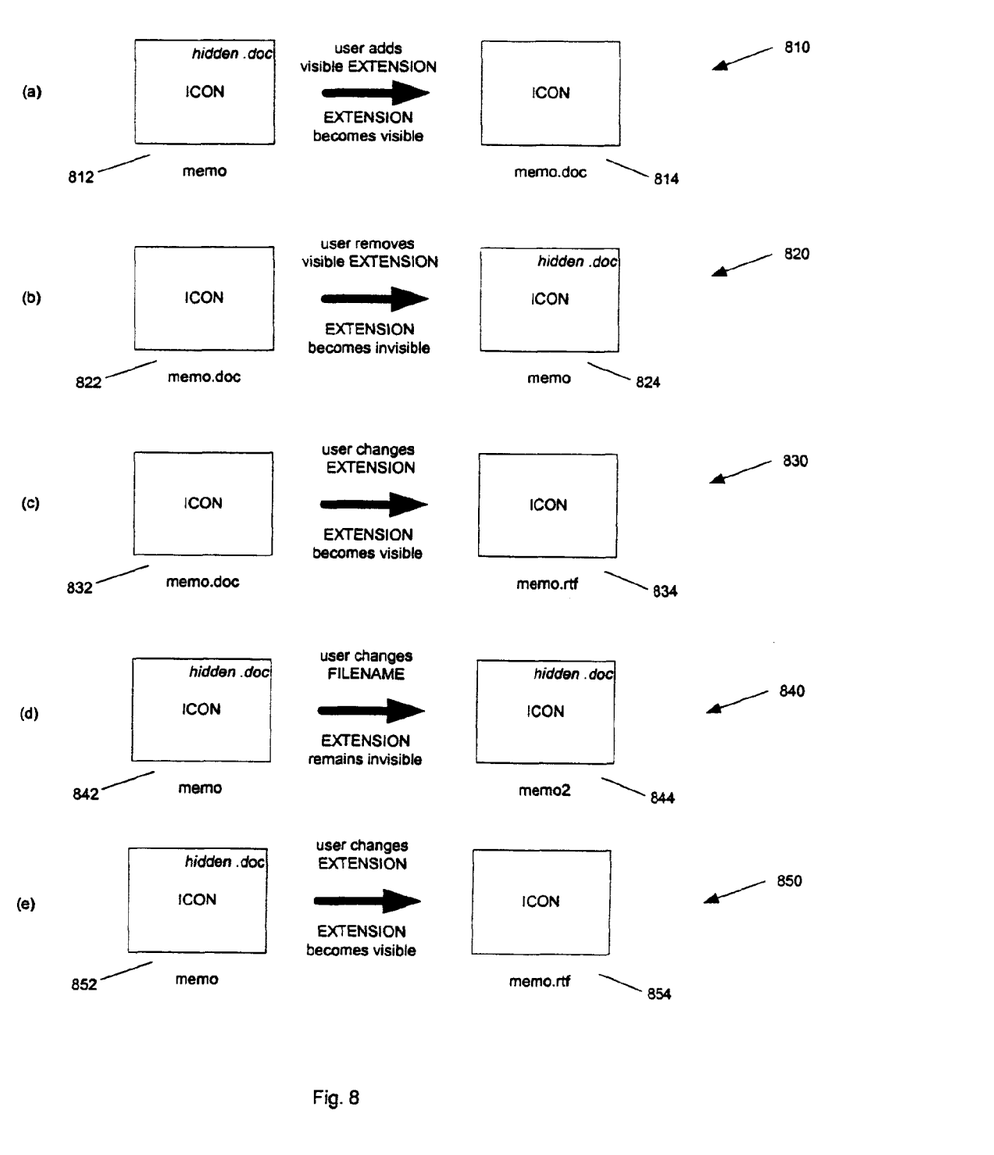
FIG. 8 shows examples according to the present invention for processing the inputs for renaming files.

FIG. 8 shows an example of one embodiment of the present invention when the user changes the displayed name in the user interface. Scenario 810 shows the situation where the user adds the invisible extension of the file to the displayed name of the file in the user interface. This would occur when, for example, the user changes the name ("memo") of the file to a new name ("memo.doc") which includes the extension. That is, the user types, for the new name, "memo.doc". Display 812 shows an icon of the file with a displayed name that does not contain an extension in the user interface before the user adds the extension. After the user adds the invisible extension to the displayed name, the displayed name of the file contains the extension, as seen in display 814. The extension of the file becomes visible, while the name of the file is not changed at all. The filename would be renamed to have a second extension (e.g. " memo.doc.doc") if an embodiment of the prior art as shown in FIG. 3 was used.

Scenario 820 shows the situation where the user deletes the visible extension from the displayed name of the file in the user interface. Before the operation the file has a visible extension displayed on the user interface, as in display 822. After the operation the file has an invisible extension that is not displayed on the user interface, as in display 824.

Scenario 830 shows the situation where the user changes the visible extension of the file. After the operation the file has a visible extension, as in display 834.

Scenario 840 shows the situation where the user changes the displayed name of a file with an invisible extension. Only the filename of the file is changed. The extension remains invisible after the change. Display 842 and 844 show the displayed names of the file before and after the change.

Scenario 850 shows the situation where the user adds an extension to the displayed name that has an invisible extension. The invisible extension is different from the newly added extension. Display 852 shows the displayed name with a hidden extension. The extension of the file is changed and made visible on the user interface after the user adds the new extension. In this case the filename remains the same as being seen in display 854. However, the filename would be renamed to have a second extension (e.g. " memo.doc.rtf") if an embodiment of the prior art, as shown in FIG. 3, was used.

Figure 9A:
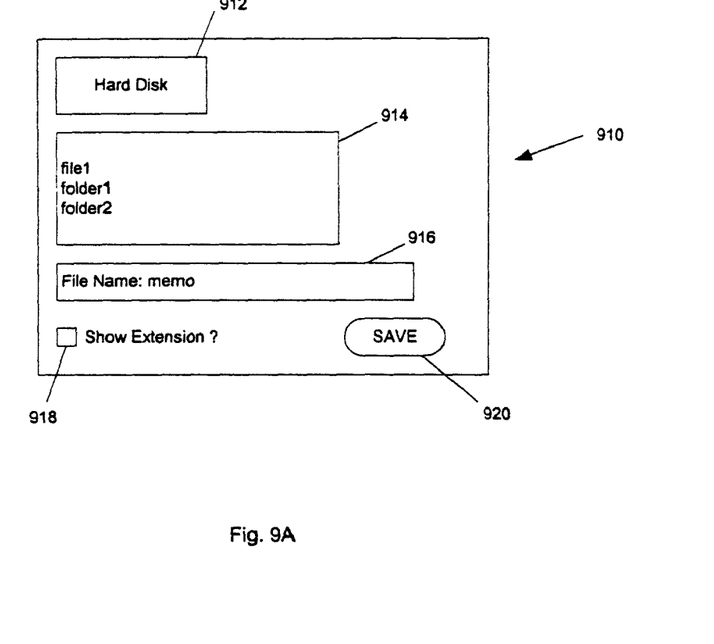
FIGS. 9a and 9b show examples of a user interface according to the present invention for processing the file name inputs.
Figure 9B:
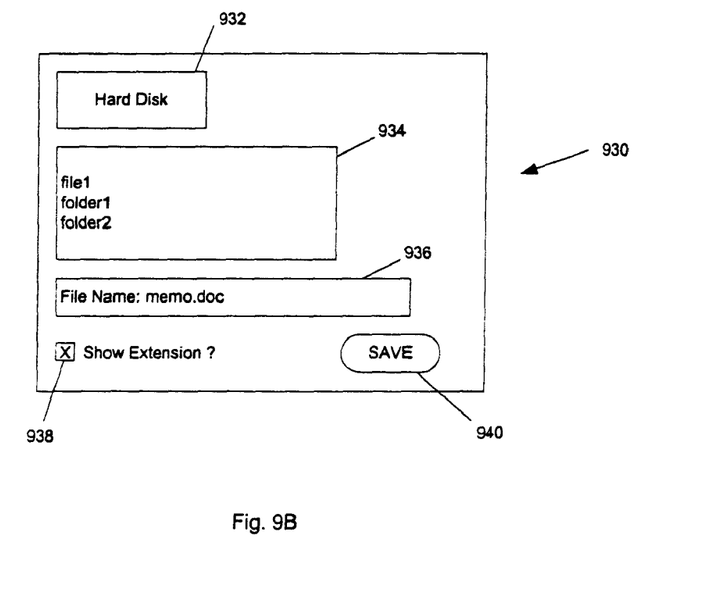

FIGS. 9a and 9b show an example of one embodiment of a user interface of the present invention when the user creates a new file. A user interface 910 contains a selection box 912, a list box 914, an entry box 916, a check box 918 and a button 920. In the user interface 910 the check box 918 is unchecked. By not checking the check box the user indicates that the extension of the file shall be hidden in the user interface. The user is prompted to save the file in the folder or location specified in the selection box 912. A list of existing files in the folder or location is shown in the list box 914. The entry box 916 takes as an input the filename of the file from the user. Typically, the user would type the desired filename (or speak it if the system supports speech recognition). Since the user does not want to see the extension, the extension is not shown in the entry box 916. An invisible extension that is appropriate for this file will be added for this file automatically after the user clicks on the button 920.

A user interface 930 contains a selection box 932, a list box 934, an entry box 936, a check box 938 and a button 940, which correspond to the selection box 912, the list box 914, the entry box 916, the check box 918 and the button 920 in the user interface 910. In the user interface 930 the check box 938 is checked. By checking the check box the user indicates that the extension of the file shall be shown in the user interface (e.g. in a listing of filenames). The user is prompted to save the file in the folder or location specified in the selection box 932. A list of existing files in the folder is shown in the list box 934. Entry box 936 takes the input for the file name. Since the user wants to see the extension, the extension is shown in the entry box 936. The user presses the button 940 to finalize the input.

In a preferred embodiment of the invention, the user interface 910 automatically checks the check box 918 to switch to the user interface 930 when the user interface detects the existence of an extension in the entry box 916. When the user interface 930 detects the absence of an extension in the entry box 936, it automatically clears the check box 938 to switch to the user interface 910. By default the check box is unchecked so that the extension of the file will be normally appended automatically by the system and be invisible. When the check box 938 is checked, the user interface will show the extension automatically in the entry box 936 so that the user doesn't have to type the extension.

Thus, with the various embodiments of the invention a user may indicate to the system to show or not show an extension for a single file in a plurality of files. That is, the user's choice is selectable for a single file in a group of files. So, if only one file is selected to hide an extension the other files may all show their extensions, and vice versa. Further, the user may select, for a subset of files, whether to show or not to show an extension for the subset where the subset is part of a plurality of files. The subset will be understood to be one or more files in the plurality of files but less than all of the files in the plurality of files.

Figure 10:
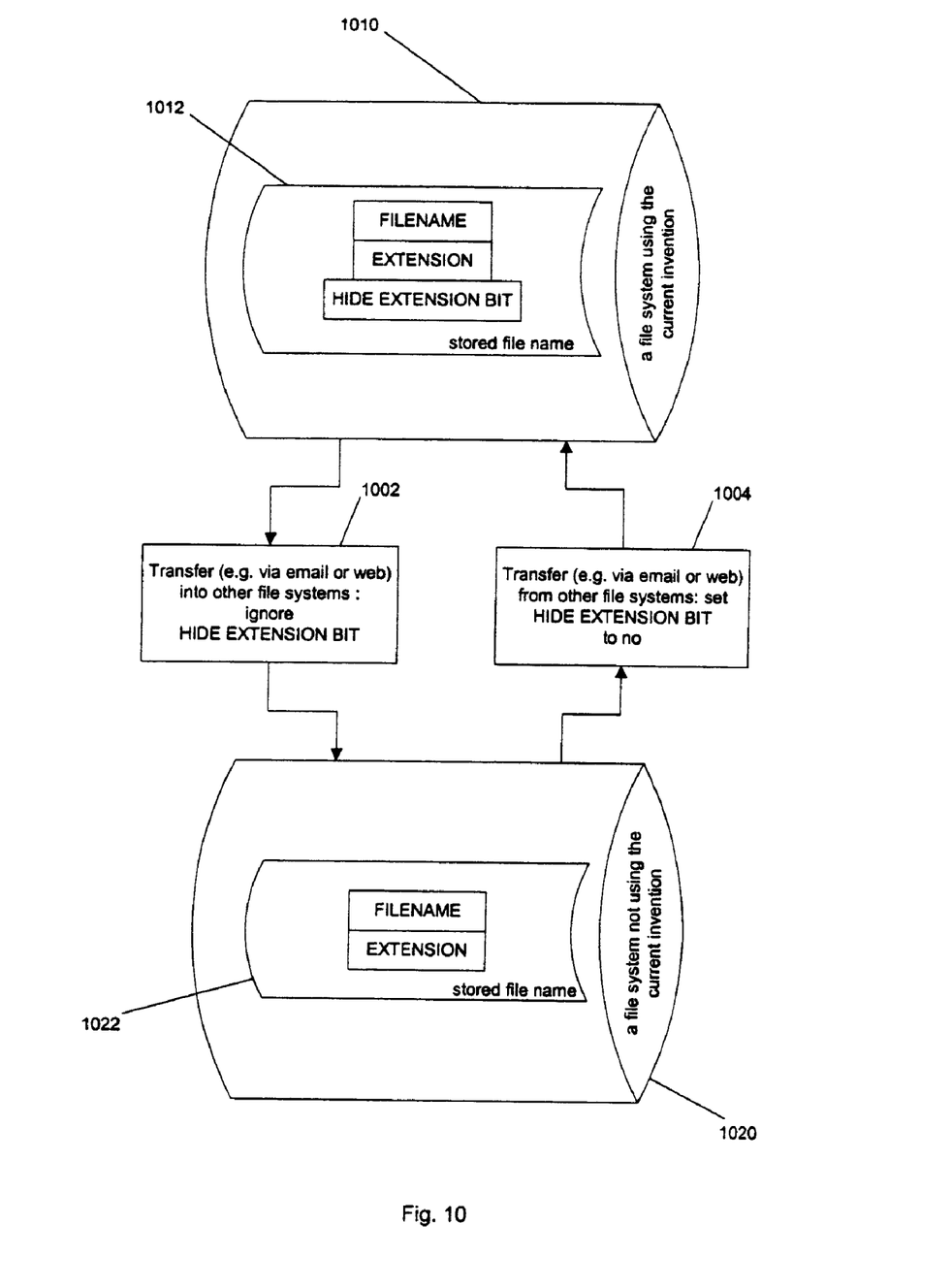
FIG. 10 shows examples according to the present invention for exchanging files with a remote system.

FIG. 10 shows an example of one embodiment of the present invention when a file is exchanged with a remote system which does not use the present invention, such as a Windows machine or the Web. The file on a local system 1010, which uses the current invention, has a hide extension bit associated with the file in memory 1012. On the other hand, the file on a remote system 1020 does not have a hide extension bit associated with it in memory 1022. In operation 1004 when the file is transferred from the remote system 1020 to the local system 1010, both the filename and the extension of the remote file on the remote system 1020 are used to name the file on the local system 1010. The type information of the file is transferred with the file, when the extension of the remote file is also used to name the file on the local system 1010. Such a transfer can occur in terms of uploading/downloading files, using email attachments, or copying files through a removable media, etc. The hide extension bit of the file is set to NO to make the extension of the file visible. While FIG. 10 suggests that the extension of the files transferred from a remote system be visible in the user interface, other embodiments can choose to make such files invisible or depend on other parameters that reflect the user's preferences.

In operation 1002 when the file is transferred from the local system 1010 to the remote system 1020, both the filename and the extension of the file are used to name the file on the remote system 1020. The type information of the file is transferred with the file, when the extension of the file is also used to name the remote file on the remote system 1020. The hide extension bit of the file is ignored, since the remote system 1020 does not support it.

Figure 11:
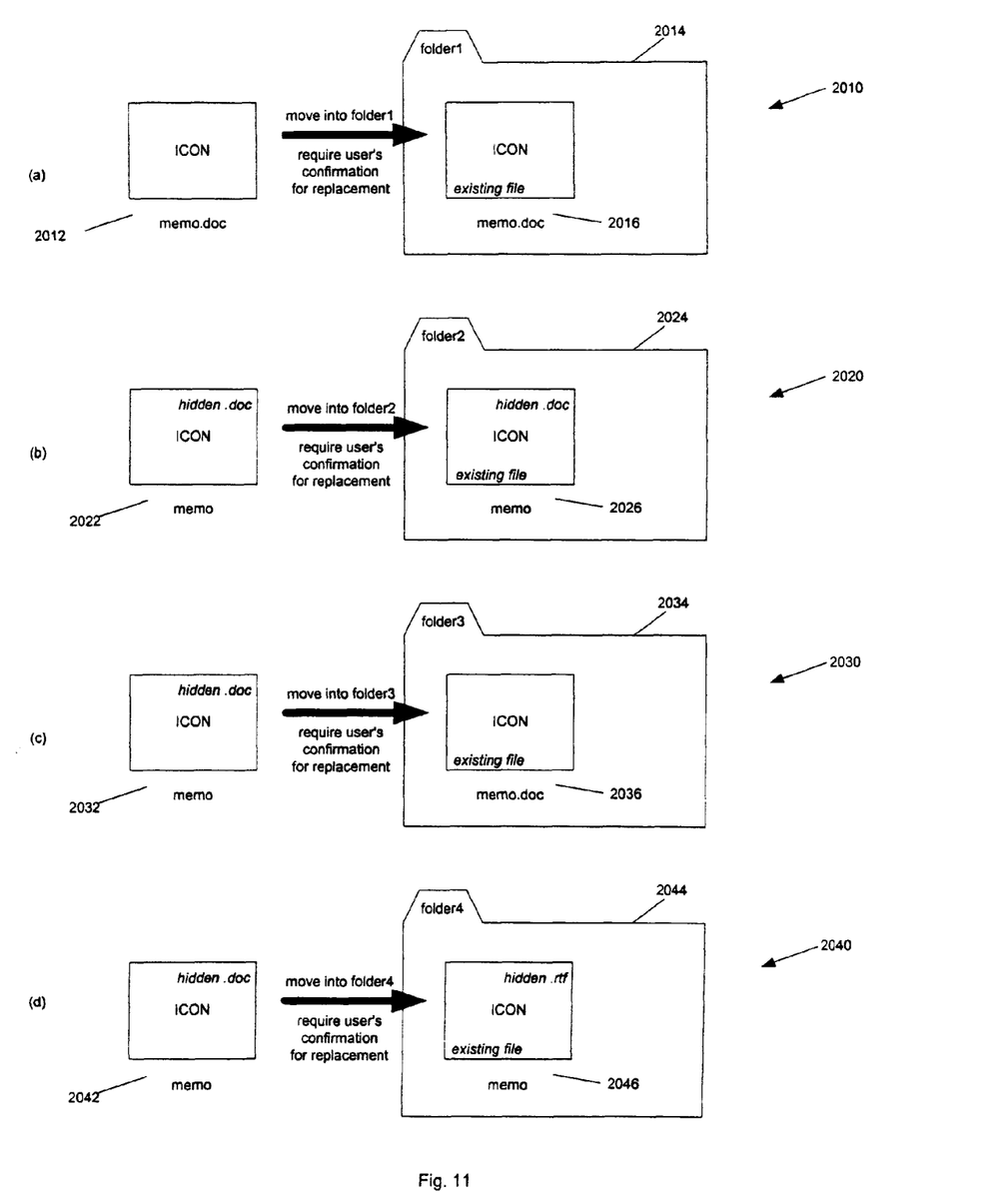
FIG. 11 shows examples according to the present invention for detecting naming conflicts.

FIG. 11 shows an example of one embodiment of the present invention in detecting naming conflicts. In scenario 2010 a file with a visible extension (display 2012) is moved into a folder 2014 that contains a file with the same displayed name (display 2016). A naming conflict is detected. The user is prompted to confirm that the file being moved will replace the existing file in the folder 2014.

In scenario 2020 a file with an invisible extension (display 2022) is moved into a folder 2024 that contains a file with the same displayed name (display 2026). A naming conflict is detected. The user is prompted to confirm that the file being moved will replace the existing file in the folder 2024.

In scenario 2030 a file with an invisible extension (display 2032) is moved into a folder 2034 that contains a file with a different displayed name (display 2036). However, the filename and the extension of the file being moved are the same as the filename and the extension of the existing file. A naming conflict is detected. The user is prompted to confirm that the file being moved will replace the existing file in the folder 2034.

In scenario 2040 a file with an invisible extension (display 2042) is moved into a folder 2044 that contains a file with the same displayed name (display 2046). Although the extension of the file being moved is different from the extension of the existing file, the displayed name of these two files are the same. A naming conflict is detected. The user is prompted to confirm that the file being moved will replace the existing file in the folder 2044. However, since the extensions of the files are different, other embodiments can allow these two files to coexist in the same folder by distinguishing them with different icons that are associated with different extensions.

While FIG. 11 illustrates the methods for detecting naming conflicts when a file is moved into a file container (e.g. a folder), those skilled in the art will recognize that these methods can also be used to detect naming conflicts in other situations, such as copying or downloading a file into a file container, naming or renaming a file, and others.

In one embodiment of the present invention, a file system allocates a bit for each file in the file system to store an indicator for the file which indicates whether or not the extension of the file is displayed in a user interface. In other embodiments of the present invention, such indicators may be implemented using special files in a file system, entries in special files, or entries in databases. For example, in one embodiment of the present invention, a special file in a folder is created to store the indicators for the files in the folder. In the absence of an indicator for a file, the displayed name of the file contains the extension of the file.

In one embodiment of the present invention, a user can set an option to indicate whether or not unknown extensions are treated as extensions of files. If the user chooses not to treat unknown extensions as extensions of files, only known extensions are treated as extensions of files. In this case, for example, "memo.xyz" will be considered to have a filename "memo.xyz" and no extension (or an extension that is an empty string), since ".xyz" is not an known extension. Then, the unknown extension ".xyz" is displayed in the user interface as part of the filename of the file.

If the user chooses to treat unknown extensions as extensions of files, all extensions are treated as extensions of files. In this case, for example, "memo.xyz" will be considered to have a filename "memo" with an extension ".xyz". Then, whether or not the displayed name of a file in the user interface contains the extension of the file (e.g., ".xyz") depends on the state of the hide extension bit of the file.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   detecting a conflict in naming a first file and a second file in a file container in a digital processing system with a user interface, wherein said first file has a first file name stored in a memory, the stored first file name having a first extension and a first filename, wherein said second file has a second file name stored in the memory, the stored second file name having a second extension and a second filename, wherein said stored first file name has a first indicator which is specific for said first file and which indicates the first extension is displayed in the user interface in a first style using a first displayed name and said stored second file name has a second indicator which indicates the second extension is displayed in the user interface in a second style using a second displayed name.

2. A method as in claim 1 wherein if the first displayed name is the same as the second displayed name, then a conflict is detected.

3. A method as in claim 1 wherein if the first filename and the first extension are the same as the second filename and the second extension, then a conflict is detected.

4. A method as in claim 1, wherein the conflict is detected when the first file is moved, copied, or downloaded into the file container.

5. A method as in claim 1, further comprising prompting a user to confirm that the first file is to replace the second file in response to detecting the conflict.

6. A method as in claim 1 wherein said first style and said second style are selected from a set of styles, said set of styles comprising
   (a) showing an extension of a file on a display; and
   (b) hiding an extension of a file so that it is not being displayed.

7. A method as in claim 1 wherein each of said first indicator and the second indicator is a bit, a file, an entry in a file, or an entry in a database.

8. A method as in claim 1 wherein if the first file is newly created with an automatically appended extension, then said first indicator is set to hide the extension of the first file in the user interface.

9. A method as in claim 1 further comprising
   updating said first indicator in response to an input event.

10. A method as in claim 1 further comprising
    replacing the second filename with the first filename while maintaining the second extension unchanged.

11. A method as in claim 1 further comprising
    exporting said first indicator to a remote system when the first file is transferred to the remote system.

12. A method as in claim 1 further comprising
    importing said first indicator from a remote system when the first file is transferred from the remote system.

13. A method as in claim 1 further comprising
    storing an option, wherein said option in one state indicates that unknown extensions are not extensions of files and said option on another state indicates that unknown extensions are extensions of files.

14. A non-transitory machine readable medium for use with a digital processing system which has a user interface and a plurality of files, each file having a name and an extension, said machine readable medium storing executable computer program instructions which when executed by said digital processing system causes said system to perform operations comprising:
    detecting a conflict in naming a first file and a second file in a file container in the digital processing system, wherein said first file has a first file name stored in a memory, the stored first file name having a first extension and a first filename, wherein said second file has a second file name stored in a memory, the stored second file name having a second extension and a second filename, wherein said stored first file name has a first indicator which is specific for said first file and which indicates the first extension is displayed in the user interface in a first style using a first displayed name and said stored second file name has a second indicator which indicates the second extension is displayed in the user interface in a second style using a second displayed name.

15. A medium as in claim 14 wherein if the first displayed name is the same as the second displayed name, then a conflict is detected.

16. A medium as in claim 14 wherein if the first filename and the first extension are the same as the second filename and the second extension, then a conflict is detected.

17. A medium as in claim 14, wherein the conflict is detected when the first file is moved, copied, or downloaded into the file container.

18. A medium as in claim 14, further comprising instructions that cause the system to perform operations comprising
prompting a user to confirm that the first file is to replace the second file in response to detecting the conflict.

19. A medium as in claim 14 wherein said first style and said second style are selected from a set of styles, said set of styles comprising
(a) showing an extension of a file on a display; and
(b) hiding an extension of a file so that it is not being displayed.

20. A medium as in claim 14 wherein each of said first indicator and the second indicator is a bit, a file, an entry in a file, or an entry in a database.

21. A medium as in claim 14 wherein if the first file is newly created with an automatically appended extension, then said first indicator is set to hide the extension of the first file in the user interface.

22. A medium as in claim 14 further comprising instructions that cause the system to perform operations comprising
updating said first indicator in response to an input event.

23. A medium as in claim 14 further comprising instructions that cause the system to perform operations comprising
replacing the second filename with the first filename while maintaining the second extension unchanged.

24. A medium as in claim 14 further comprising instructions that cause the system to perform operations comprising
exporting said first indicator to a remote system when the first file is transferred to the remote system.

25. A medium as in claim 14 further comprising instructions that cause the system to perform operations comprising
importing said first indicator from a remote system when the first file is transferred from the remote system.

26. A medium as in claim 14 further comprising instructions that cause the system to perform operations comprising
storing an option, wherein said option in one state indicates that unknown extensions are not extensions of files and said option on another state indicates that unknown extensions are extensions of files.

27. A digital processing system with a user interface and a plurality of files, each file having a name that comprises a filename and an extension, said system comprising:
means for detecting a conflict in naming a first file and a second file in a file container in the digital processing system, wherein said first file has a first file name stored in a memory, the stored first file name having a first extension and a first filename, wherein said second file has a second file name stored in the memory, the stored second file name having a second extension and a second filename, wherein said stored first file name has a first indicator which is specific for said first file and which indicates the first extension is displayed in the user interface in a first style using a first displayed name and said stored second file name has a second indicator which indicates the second extension is displayed in the user interface in a second style using a second displayed name.

28. A system as in claim 27 wherein if the first displayed name is the same as the second displayed name, then a conflict is detected.

29. A system as in claim 27 wherein if the first filename and the first extension are the same as the second filename and the second extension, then a conflict is detected.

30. A system as in claim 27, wherein the conflict is detected when the first file is moved, copied, or downloaded into the file container.

31. A system as in claim 27, further comprising means for prompting a user to confirm that the first file is to replace the second file in response to detecting the conflict.

32. A system as in claim 27 wherein said first style and said second style are selected from a set of styles, said set of styles comprising
(a) showing an extension of a file on a display; and
(b) hiding an extension of a file so that it is not being displayed.

33. A system as in claim 27 wherein each of said first indicator and the second indicator is a bit, a file, an entry in a file, or an entry in a database.

34. A system as in claim 27 wherein if the first file is newly created with an automatically appended extension, then said first indicator is set to hide the extension of the first file in the user interface.

35. A system as in claim 27 further comprising
means for updating said first indicator in response to an input event.

36. A system as in claim 27 further comprising
means for replacing the second filename with the first filename while maintaining the second extension unchanged.

37. A system as in claim 27 further comprising
means for exporting said first indicator to a remote system when the first file is transferred to the remote system.

38. A system as in claim 27 further comprising
means for importing said first indicator from a remote system when the first file is transferred from the remote system.

39. A system as in claim 27 further comprising
means for storing an option, wherein said option in one state indicates that unknown extensions are not extensions of files and said option on another state indicates that unknown extensions are extensions of files.

* * * * *